(12) United States Patent
Wei

(10) Patent No.: US 6,579,017 B2
(45) Date of Patent: Jun. 17, 2003

(54) TRIPOD

(76) Inventor: David Wei, 6F., No. 17, Der-Huey Street, Taipei (TW)

( * ) Notice: Subject to any disclaimer, the term of this patent is extended or adjusted under 35 U.S.C. 154(b) by 0 days.

(21) Appl. No.: 09/984,704

(22) Filed: Oct. 31, 2001

(65) Prior Publication Data

US 2003/0081953 A1 May 1, 2003

(51) Int. Cl.⁷ .......................... G03B 17/00; F16M 11/38
(52) U.S. Cl. .................. 396/428; 248/168; 248/170; 248/181.1
(58) Field of Search ........................... 396/419, 428; 248/167, 168, 169, 170, 171, 178.1, 181.1

(56) References Cited

U.S. PATENT DOCUMENTS

| | | | | | |
|---|---|---|---|---|---|
| 2,703,691 A | * | 3/1955 | Minnis | ........................ | 108/146 |
| 3,908,945 A | * | 9/1975 | Shapiro et al. | ............. | 248/165 |
| 4,121,799 A | * | 10/1978 | Michio | ........................ | 248/171 |
| 4,214,724 A | * | 7/1980 | Geiger | ........................ | 248/167 |
| 4,648,698 A | * | 3/1987 | Iwasaki | .................... | 248/163.1 |
| 4,751,540 A | * | 6/1988 | Jones | ........................... | 248/168 |
| 5,390,885 A | * | 2/1995 | Shen | ........................... | 248/168 |
| 5,510,863 A | * | 4/1996 | Kliewer | ....................... | 396/428 |
| 5,650,821 A | * | 7/1997 | Hewlett | ....................... | 348/373 |
| 5,708,890 A | * | 1/1998 | Nakano | ........................ | 248/166 |
| 6,007,259 A | * | 12/1999 | Mori et al. | .................. | 248/168 |

* cited by examiner

Primary Examiner—Alan A. Mathews
(74) Attorney, Agent, or Firm—Donald C. Casey, Esq.

(57) ABSTRACT

A tripod is constructed to include a platform unit, which enables the platform thereof to be adjusted horizontally through 360°, a support unit for enabling the platform unit to be adjusted to the desired tilting angle, the support unit having a rear leg pivoted to a center post thereof, and a mounting leg unit adapted for securing the support unit to a tree, table top, or the like, the mounting leg unit having a short leg and a long leg adapted for making a scissors action, a clamping foot member pivoted to the short leg, a lock adapted for locking the legs, and an adjustment screw adapted for moving the clamping foot member relative to the long leg.

1 Claim, 4 Drawing Sheets

TRIPOD

BACKGROUND OF THE INVENTION

The present invention relates to tripods and, more particularly, to such a tripod that can be clamped on the tree, table top, or the like to hold the camera platform in position, enabling the camera platform to be adjusted horizontally through 360°.

A tripod is a support with three legs commonly used for supporting a camera on the ground. FIG. 1 shows a conventional tripod, which comprises a camera platform pivoted to the center post thereof, and three legs hinged to the center post. This structure of tripod is still not satisfactory in function because of the following drawbacks.

1. The connection between the camera platform and the center post is unstable, and the camera platform tends to be forced out of position when bearing a heavy load.
2. The connection between the legs and the center post is unstable, and the legs tend to be forced out of position relative to one another.

SUMMARY OF THE INVENTION

The present invention has been accomplished to provide a tripod, which eliminates the aforesaid drawbacks. It is the main object of the present invention to provide a tripod, which positively secures the camera platform in position when locked. It is another object of the present invention to provide a tripod, which enables the user to conveniently adjust the position of the camera platform horizontally as well as vertically. It is still another object of the present invention to provide a tripod, which can be clamped on a tree, table top, or any of a variety of support means to hold the camera platform positively in position. According to one aspect of the present invention, the tripod comprises a platform unit, which enables the platform thereof to be adjusted horizontally through 360°, support unit adapted for supporting the platform unit for enabling the platform unit to be adjusted to the desired tilting angle, the support unit having a rear leg pivoted to a center post thereof, and a mounting leg unit adapted for securing the support unit to a tree, table top, or the like, the mounting leg unit having a short leg and a long leg adapted for making a scissors action, a clamping foot member pivoted to the short leg, a lock adapted for locking the legs, and an adjustment screw adapted for moving the clamping foot member relative to the long leg. According to another aspect of the present invention, the short leg and the long leg each have a toothed face meshed with each other and reliably locked by the lock of the mounting leg unit.

DETAILED DESCRIPTION OF THE PREFERRED EMBODIMENT

Figure 1:
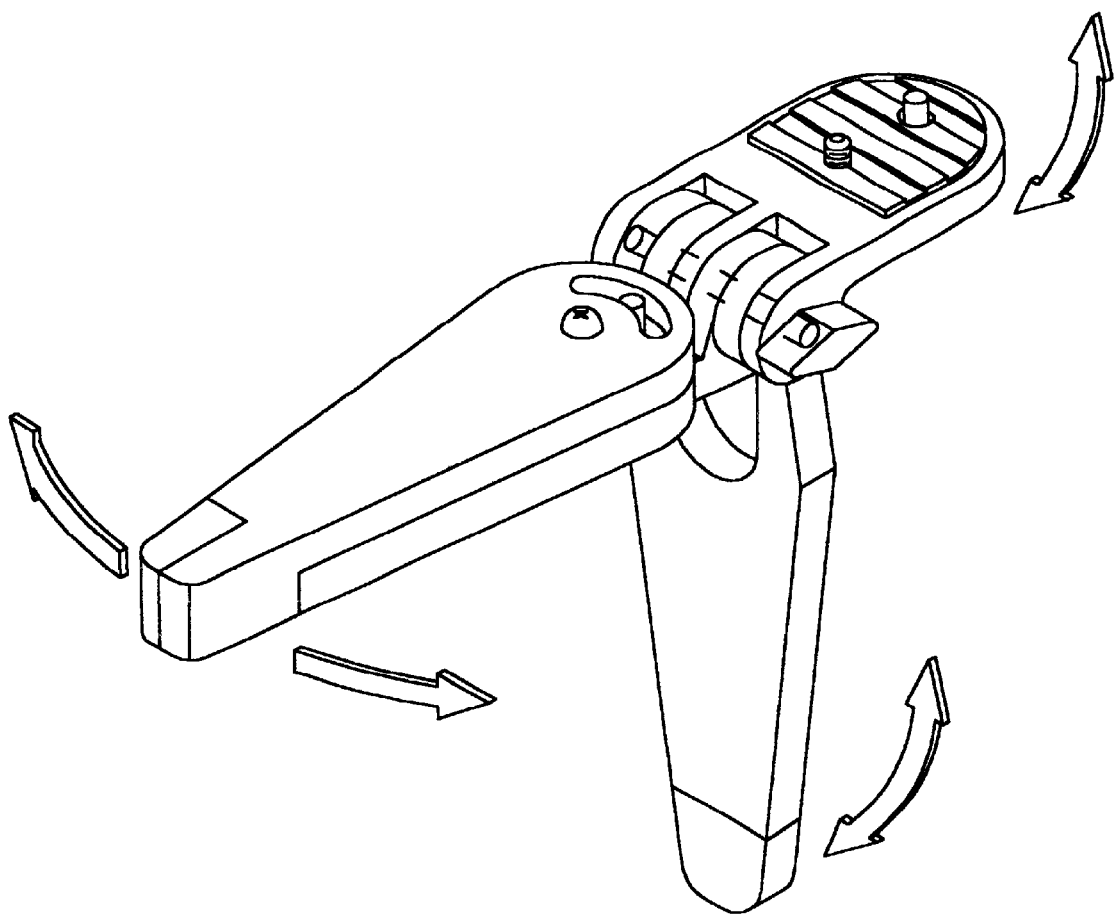
FIG. 1 is a perspective view of a tripod according to the prior art.
Figure 2:
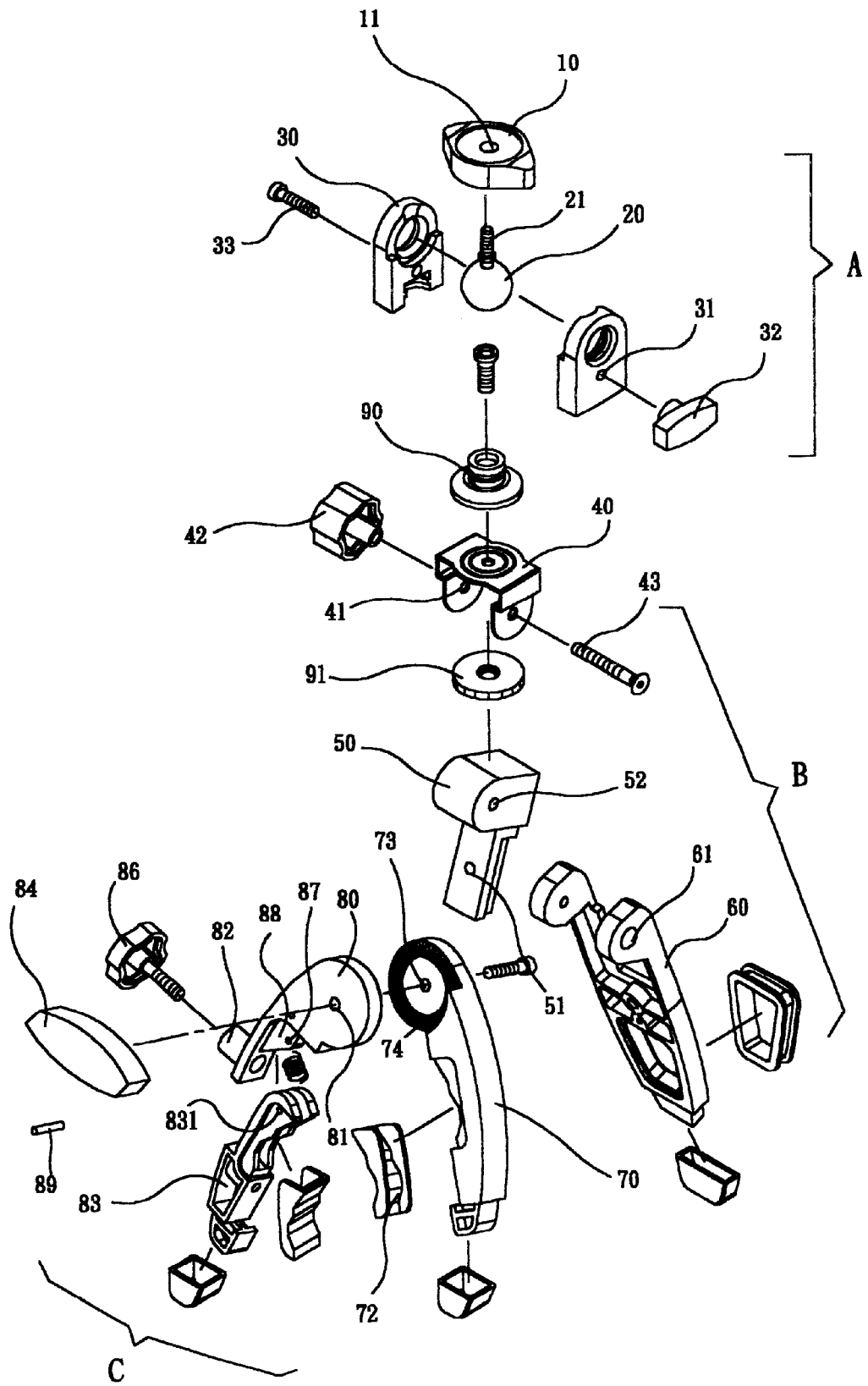
FIG. 2 is an exploded view of a tripod according to the present invention.
Figure 3:
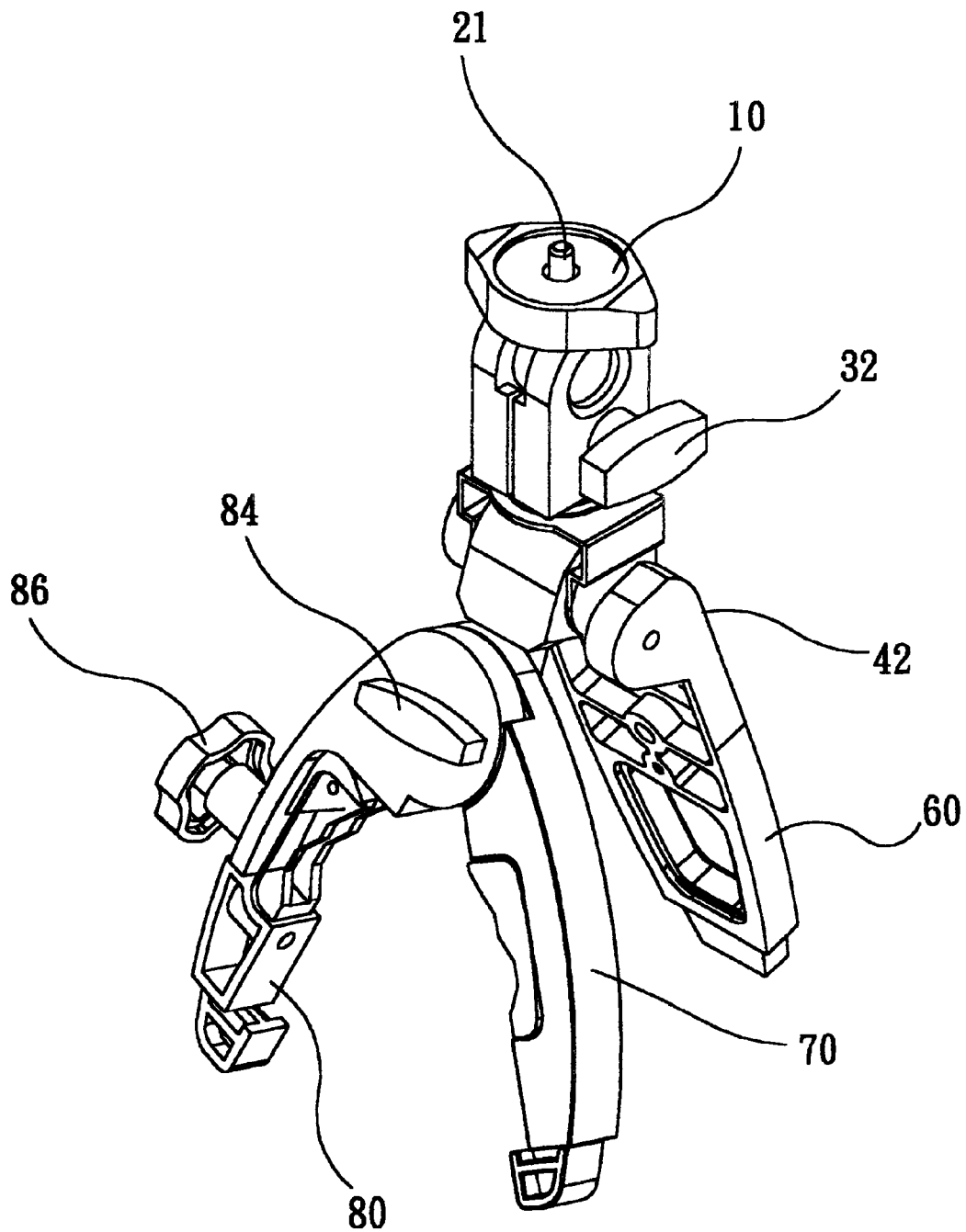
FIG. 3 is an elevational view of the tripod according to the present invention.

Referring to FIGS. 2 and 3, a tripod in accordance with the present invention is generally comprised of a platform unit A, a support unit B, and a mounting leg unit C.

The platform unit A comprises a camera platform 10, a ball 20, a ball socket assembly 30, a locating screw bolt 33, and a lock nut 32. The camera platform 10 has a center through hole 11. The ball 20 has a screw rod 21 extended from the periphery thereof and inserted through the center through hole 11 of the camera platform 10 from the bottom side toward the top side and adapted for securing a camera to the top side of the camera platform 10. The ball socket assembly 30 holds the ball 20 on the inside, having a transversely extended through hole 31. The locating screw bolt 33 is mounted in the transversely extended through hole 31 of the ball socket assembly 30. The lock nut 32 is threaded onto the locating screw bolt 33, and controlled to lock/unlock the ball 20. When loosened the lock nut 32, the ball 20 can be rotated with the camera platform 10 and the camera (not shown) through 360° relative to the ball socket assembly 30.

The support unit B comprises a post 50, a holder frame 40, a locating screw bolt 43, a lock nut 42, a rear leg 60, a rotary carrier 90, and a packing plate 91. The post 50 is a headed rod member having a first through hole 52 transversely extended through the head thereof in X-axis direction and a second through hole 51 transversely extended through the shank thereof in Y-axis direction and spaced below the first through hole 52. The rear leg 60 has two eye lugs 61 bilaterally disposed at the top side thereof and respectively connected to the first through hole 52 of the post 50 at two sides. The holder frame 40 is a substantially n-shaped frame attached to the head of the post 50, having two downward eye lugs 41 respectively connected between the two opposite lateral side walls of the head of the post 50 and the eye lugs 61 of the rear leg 60. The locating screw bolt 43 is inserted through the eye lugs 61 of the rear leg 60, the downward eye lugs 41 of the holder frame 40, and the first through hole 52 of the post 50, and then fastened up with the lock nut 42 to fix the holder frame 40, the post 50 and the rear leg 60 together. Further, the packing plate 91 and the rotary carrier 90 are fastened to the ball socket assembly 30 of the platform unit A and respectively supported on the bottom and top sidewalls of the holder frame 40.

The mounting leg unit C comprises a left leg 80, a right leg 70, a foot member 83, an adjustment screw 86, and a lock 84. The left leg 80 and the right leg 70 are attached together and can be turned relative to each other to make a scissors action, each having a toothed face 74 and a pivot hole 73 extended through the center of the toothed face 74. The toothed faces 74 of the legs 70 and 80 are meshed together and releasably fastened to the second through hole 51 of the post 50 by the lock 84. The left leg 80 is about one half of the length of the right leg 70, having a female screw 82 transversely disposed near the bottom end thereof, and a flange 88 downwardly protruded from a middle part thereof. Further, a clamping block 72 is fastened to a notched middle part of the right leg 70. The flange 88 has a through hole 87. The foot member 83 is pivoted to the through hole 87 of the flange 88 of the left leg 80 by a pivot pin 89. The adjustment screw 86 is threaded into the female screw 82 of the left leg 80 and stopped against one side of the foot member 83. By means of rotating the adjustment screw 86 forwards/backwards, the foot member 83 is turned about the pivot pin 89 relative to the clamping block 72 at the right leg 70 so that the pitch between the foot member 83 and the right leg 70 is adjusted subject to the support means (not shown) on which the mounting leg unit C is mounted.

Figure 4:
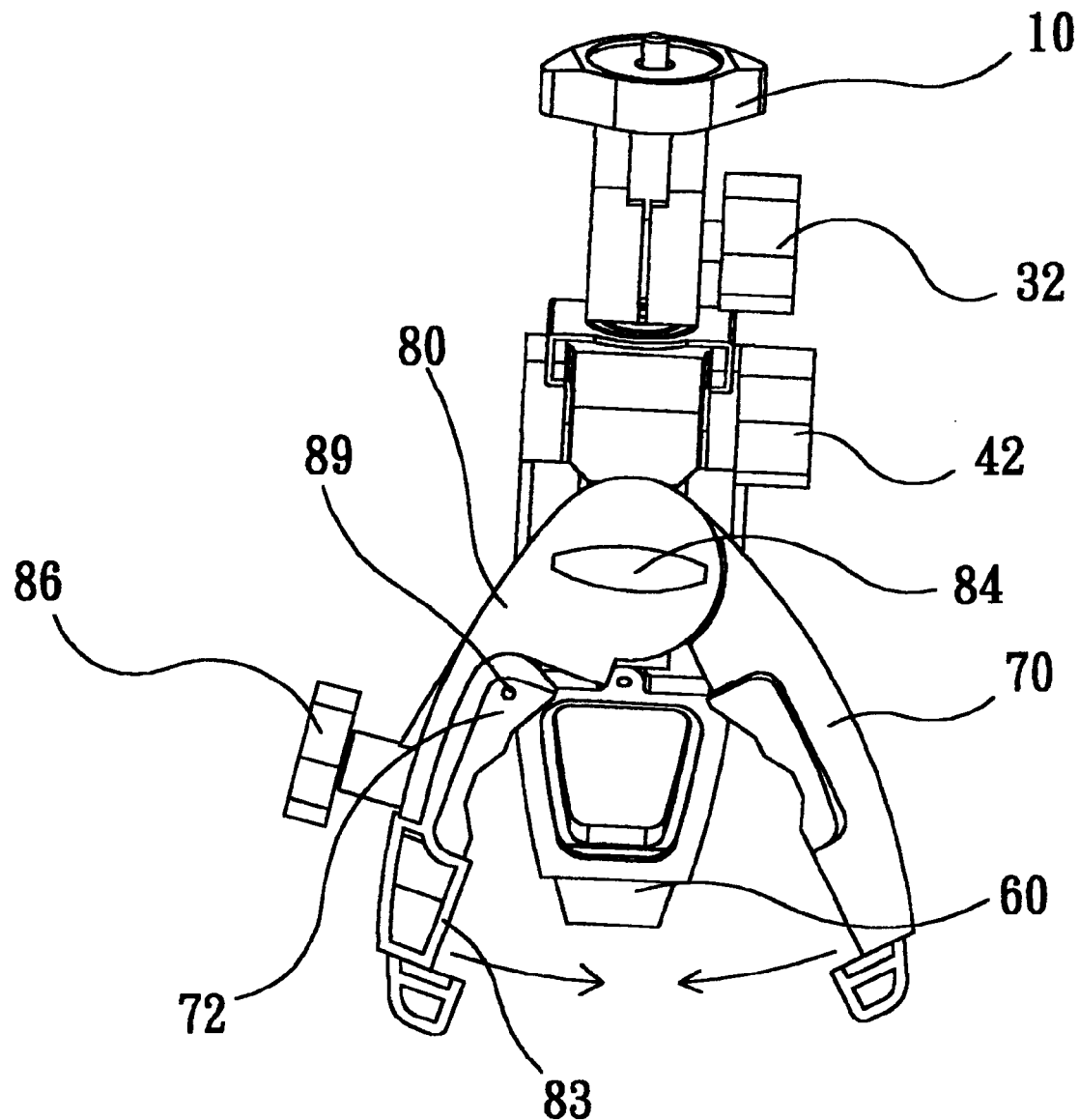
FIG. 4 is a front view of the tripod according to the present invention.

FIG. 4 shows the tripod assembled and locked in the extended position. When not in use, the lock 84 of the mounting leg unit C is unlocked, and then the right leg 70 and the left leg 80 turned toward each other and closed.

Referring to FIG. 4 and FIG. 2 again, when in use, the foot member 83 and the right leg 70 are attached to the support means (for example, a tree, table board, . . . etc.) at two sides, etc) at tw adjustment screw 86 is fastened tight to secure the tripod to the support means positively. When loosened the lock nut 42, the platform unit A can be turned with the holder frame 40 back and forth relative to the post 50 to the desired tilting angle. When loosened the lock nut 32 of the platform unit A, the camera platform 10 can be rotated with the ball 20 and the camera horizontally through 360° to the desired angular.

A prototype of tripod has been constructed with the features of FIGS. 2~4. The tripod functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A tripod comprising:

a platform unit, said platform unit comprising a camera platform, said camera platform having a center through hole, a ball socket unit, said ball socket unit comprising a transversely extended through hole, a ball rotatably mounted in said ball socket assembly below said camera platform, said ball having a screw rod inserted through the center through hole of said camera platform from a bottom side and adapted for securing a camera to said camera platform, a locating screw bolt mounted in the transversely extended through hole of said ball socket assembly, and a lock nut threaded onto the locating screw bolt of said platform unit and controlled to lock/unlock said ball, a support unit adapted for supporting said platform unit, said support unit comprising a post, said post having a first through hole transversely extended through a head thereof in X-axis direction and second through hole transversely extended through a shank thereof in Y-axis direction and spaced below said first through hole, a rear leg coupled to said post, said rear leg having two eye lugs bilaterally disposed at a top side thereof and respectively connected to the first through hole of said post at two sides, a substantially inverted U-shaped holder frame couple to the head of said post, said holder frame having two downward eye lugs respectively connected between two opposite lateral side walls of the head of said post and the eye lugs of said rear leg, a locating screw bolt inserted through the eye lugs of said rear leg, the downward eye lugs of said holder frame, and the first through hole of said post, a lock nut threaded onto the locating screw bolt of said support unit to fix said holder frame, said post and said rear leg together, a packing plate supported between the head of said post and said holder frame, and a rotary carrier pivoted to said holder frame and fastened to the ball socket assembly of said platform unit;

a mounting leg unit adapted for securing said support unit to support means, said mounting leg unit comprising a left leg and a right leg each having a toothed face and a pivot hole extended through the center of said toothed face, the toothed faces of said legs being meshed together, a lock mounted in the pivot holes of the toothed faces of said left leg and said right leg and second through hole of said post and rotated to lock/unlock said left leg and said right leg, said left leg having a female screw transversely disposed near a bottom end thereof and a flange downwardly protruded from a middle part thereof, said flange having a through hole, a clamping block fastened to a notched middle part of said right leg, a foot member pivoted to the through hole of the flange of said left leg by a pivot pin, and adjustment screw threaded into the female screw of said left leg and stopped against one side of said foot member for rotation by hand to turn said foot member about said pivot pin relative to the clamping block at said right leg.

* * * * *